United States Patent [19]

Horvitz

[11] 3,722,271
[45] Mar. 27, 1973

[54] GEOCHEMICAL PROSPECTING IN SUBMERGED AREAS

[76] Inventor: Leo Horvitz, 8116 Westglen Dr., Houston, Tex. 77042

[22] Filed: Nov. 20, 1970

[21] Appl. No.: 91,532

[52] U.S. Cl. ................... 73/170 A, 23/230 EP, 73/23
[51] Int. Cl. ............................................. E21b 47/10
[58] Field of Search......... 73/170 A, 19, 23; 166/250; 23/230 EP

[56] References Cited

UNITED STATES PATENTS

| | | | |
|---|---|---|---|
| 2,918,579 | 12/1959 | Slobod et al. | 23/23 UX |
| 2,192,525 | 3/1940 | Rosaire et al. | 73/23 X |
| 2,641,922 | 6/1953 | Smith | 73/19 X |
| 3,455,144 | 7/1969 | Bradley | 73/19 |
| 3,418,841 | 12/1968 | Issenmann | 73/19 |

Primary Examiner—Jerry W. Myracle
Attorney—Charles E. Lightfoot

[57] ABSTRACT

A method of geochemical prospecting in submerged areas comprising the taking of samples of the water at or close to the bottom at spaced locations in such an area, which samples are then analyzed to determine the concentration therein of leakage products indicative of the presence of subterranean petroliferous deposits and the results of such analyses are correlated with sample location to provide information concerning such deposits. The method also includes the taking of samples of the earth formation beneath the bottom at such sample locations from which the character of the formation and the concentration therein of products indicative of the presence of subterranean petroliferous deposits may be obtained.

10 Claims, No Drawings

3,722,271

GEOCHEMICAL PROSPECTING IN SUBMERGED AREAS

BACKGROUND OF THE INVENTION

The present invention relates to a method of geochemical exploration for subterranean petroleum deposits located in submerged areas.

The taking of soil samples in unsubmerged land areas and analyzing such samples for leakage products from subterranean petroliferous deposits to obtain information indicative of the presence of such deposits, is a well know method of geochemical exploration.

Examples of the carrying out of such geochemical exploration and the details of methods employed heretofore for this purpose are disclosed in the following U.S. Pats.: No. 2,192,525 — Geophysical Prospecting Method, issued to E. E. Rosaire and Leo Horvitz on Mar. 5, 1940; No. 2,261,764 — Geochemical Prospecting, issued to Leo Horvitz on Nov. 4, 1941; and No. 2,330,717 — Geochemical Prospecting, issued to Leo Horvitz on Sept. 28, 1943.

In accordance with such methods samples of the soil are taken at spaced apart locations in an area to be explored, at depths such that they are not affected by climatic changes or surface contamination, and the samples are analyzed to determine the concentration therein of leakage products, such as methane, ethane, propane, or other hydrocarbons of the same or an analogous homologous series, or other substances indicative of subterranean petroliferous deposits. The results of such analyses are then correlated with sample locations, as by plotting the same on a map or chart, to obtain information concerning subterranean petroliferous deposits in the area.

The taking of samples in carrying out geochemical explorations of this kind in unsubmerged areas is not ordinarily attended by unusual difficulties, the samples being obtained by operations of a usual kind, such as drilling, and placed in containers, such as screw capped jars for transportation to the laboratory for analysis.

In submerged areas, the taking of samples for the carrying out of such geochemical prospecting has not proven satisfactory due to difficulty in obtaining samples of the formation beneath the bottom. Moreover, when the bottom formation is of coarse grained or loose character, such as sand or shell, inconclusive results are often obtained, since such materials are poor absorbents of hydrocarbons resulting in low hydrocarbon concentrations in areas where high concentrations due to subterranean petroliferous deposits would ordinarily occur. Thus, in areas where the bottom formation is of hard, coarse grained character, the low hydrocarbon concentrations found in samples of such formations often do not indicate the presence of subterranean petroliferous deposits even when the samples are obtained over edges of petroleum accumulations or at other locations where high concentration should be expected.

It has now been discovered that the water at or close to the bottom in submerged areas often contains significant concentrations of leakage products, particularly gaseous hydrocarbons, indicative of subterranean petroliferous deposits, even when the character of the formation beneath the bottom is such that no significant amounts of such leakage products are retained therein, and that prospecting in such areas can be greatly facilitated and useful information concerning such deposits more easily obtained by taking samples of the water at or immediately above the bottom. Moreover, it has been found that additional information concerning such deposits, as well as the character of the earth formation from which such leakage products in the water are derived, is often obtainable by the taking of samples of the earth formation beneath the bottom at the same locations where water samples are taken.

SUMMARY OF THE INVENTION

Briefly stated the method of the present invention comprises the taking of samples of the water at or close to the bottom at spaced locations in a submerged area to be explored, analyzing the samples to determine the concentration therein of leakage products such as gaseous hydrocarbons, or the like, from subterranean petroliferous deposits, and correlating the results of such analyses with sample location to provide information concerning such subterranean petroliferous deposits.

The method of the invention may also include the taking of samples of the earth formation beneath the bottom at each location at which a water sample is taken, or at other locations in the area, whereby the character of such formation and the concentration therein of products indicative of the presence of subterranean petroliferous deposits may be obtained.

DETAILED DESCRIPTION OF THE METHOD OF THE INVENTION

The method of the invention may be carried out by taking samples of the water at or close to the bottom in submerged areas at locations conveniently spaced apart, such as at intervals of one-half mile, more or less, along predetermined lines or in any desired pattern in the area.

The samples may be obtained in any convenient manner, such as by the use of a hose extending downwardly to the bottom from a boat through which water may be pumped to obtain a sample of the water at the bottom. In taking water samples in this manner it is desirable to first pump the water up through the hose until sediment or mud appears in the water to indicate that the water is being removed at the bottom, whereupon a sample of the water may be placed in a receptacle, such as a glass jar, until the same is approximately three-fourths filled, the jar being then capped and inverted for transportation to the laboratory.

In the laboratory the gas above the water may be extracted in a usual manner underwater and collected in previously evacuated tubes for analysis. By this method of handling the samples for analysis it has been found that approximately 75 percent of the hydrocarbons of the sample are contained in the gas above the water in the sample receptacle, while 25 percent of the same are contained in the water.

For the purpose of obtaining the results of underwater prospecting by this method, as quickly as possible, a portion of the gas in each sample jar above the water therein may be withdrawn and analyzed for significant leakage products and the results correlated with sample location.

When more accurate data is required the dissolved hydrocarbons may be extracted from the water and added to the amount of the same found in the gas above the water to give a quantitative analysis of the sample.

Under some circumstances the jars may be completely filled with water samples, such as by the use of jars each provided with a valved cap, and the dissolved gas extracted in the laboratory by a well known vacuum technique and analyzed. By this means all of the dissolved gas in the water sample may be readily removed to obtain quantitative analysis of the sample for significant leakage products.

Water samples are preferably taken as close to the bottom as possible, it having been found that the concentration of significant leakage products falls off rapidly as the distance at which the sample is obtained above the bottom increases and that the concentration of such products of the water at any substantial distance above the bottom, such as a foot, or even a few inches, is too low to provide any significant information.

Samples of the earth formation beneath the bottom at the same locations where water samples are taken may also be taken to provide information concerning the characteristics of such formations and to determine the concentration of significant leakage products therein. Such formation samples may be taken by any convenient means, separately from the water samples or simultaneously therewith.

Formation samples may for example be taken in a usual manner by the use of core drills, or by the use of a weighted sample tube whose lower end is open by dropping the tube in a vertical position to cause the tube to penetrate the bottom by impact whereby a formation sample is obtained.

Samples of the water at or close to the bottom may be obtained simultaneously with samples of the bottom formation by the use of a weighted sample tube whose lower end is open and within which a plunger is movably disposed for upward movement therein from a lower position substantially closing the lower end of the tube to an upper position above the same. Means is provided in sample taking apparatus of this kind for dropping the tube downwardly in a vertical position when the tube reaches a predetermined location above the bottom, whereby the impact of the tube on the bottom may be controlled to adjust the amount of penetration of the formation.

By the use of apparatus of this type, water is excluded from the tube or barrel during lowering of the same through the water, while allowing a sample of the water at the bottom to enter the tube with a sample of the formation upon penetration of the formation by the sampler.

The water sample obtained by this means will be located at the top of the formation sample and may be poured off separately if desired into a suitable fluid tight receptacle, such as a screw capped glass jar, for transportation, while the formation sample may be placed in a plastic bag or other suitable receptacle to preserve the same for analysis. Samples of the water with or without the formation samples, may be placed in suitable receptacles, such as glass jars, which may be partly filled and inverted when closed to trap gases in the jars above the water therein. For the purpose of analyzing the samples thus taken, the jars may be opened under water with their open ends submerged, to allow the insertion of suitable means, such as a glass tube, upwardly into the jar through which a portion of the gas therein above the water may be withdrawn.

The depth of penetration of the bottom formation in taking samples of the same may, of course, vary greatly, and in general may be from a few inches to several feet, depending upon the nature of the formation. In rock areas, penetration of the bottom may prove impossible, in which case samples of water alone may suffice, while in soft formations such as deep mud or loose sand, the depth of penetration may readily extend to several feet.

The samples, thus obtained, are analyzed by well known methods, such as by the use of hydrogen flame chromatograph, to obtain the concentration therein of significant leakage products, such as hydrocarbon gases, and the results of such analyses are correlated with sample location, as by plotting the same on a map or chart of the area under investigation to provide information concerning subterranean petroliferous deposits in the area. Such correlation is carried out in a well known manner to show anomalies which may be present indicative of the occurrence of subterranean petroliferous deposits in the area.

Well known methods of analysis are now available whereby the concentration of significant leakage products may be determined in parts per billion parts by weight of the sample, which affords a sufficient degree of refinement in analysis to permit the determination of anomalies in the area under investigation to indicate the presence of subterranean petroliferous deposits.

The concentration of significant leakage products in the formation samples may be conveniently expressed as parts per billion by weight of the sample, while the concentration of the same in the water samples is expressed by volume, such as cubic centimeters times $10^{-4}$ per liter of sample.

The method of the invention may comprise the analysis of water samples or of formation samples alone, or the analysis of both water and formation samples and the correlation of the results with sample location.

Under some conditions, such as where the general nature of the bottom formation throughout a wide area is known, the taking of samples of the bottom formation at each water sampling location may be dispensed with entirely, or samples of the bottom formation may be taken only occasionally or at relatively widely spaced intervals whereby sufficient information concerning changes in the character of the formation for purposes of carrying out the method of the invention may be discovered.

In areas where the bottom formation is composed of hard, coarse grained material, such as gravel, sand or shell, in which significant leakage products from subterranean petroliferous deposits are not readily adsorbed or retained, the presence of a relatively high concentration of such products in the water at the bottom over such a formation may be indicative of the presence of such deposits.

On the other hand in areas where the bottom formation is of relatively compact character, such as clay, in which significant leakage products may be retained or adsorbed in high concentration the absence of significant concentrations of such products in the water at the bottom above such formations may not necessarily be indicative of the absence of subterranean petroliferous deposits whose presence may then be distinctly indicated by the occurrence of high concentrations of such products in the formation itself.

The presence of high concentrations of significant leakage products in both the bottom formation and in the water at the bottom at the same location may be interpreted as highly indicative of the presence of subterranean petroliferous deposits.

Where the bottom formation is of a hard, dense character, such as solid rock, such as limestone or the like, there is ordinarily no need for taking samples of the formation, since it can be penetrated only with difficulty, and in such areas the presence of large concentrations of significant leakage products in the water at the bottom may be indicative of the presence of subterranean petroliferous deposits.

The following tabulation is representative of the results of actual analyses of water samples at the bottom in submerged areas and samples of the earth formation below at the same locations, methane being used as the leakage product whose concentration was determined in each case.

TABLE

| Sample No. | Soil Methane ppb by weight | Water Methane cc × $10^{-4}$ per liter | Lithology (percent) | | |
|---|---|---|---|---|---|
| | | | Sand | Clay | Shell |
| 1 | 47 | 329 | 75 | 25 | 0 |
| 2 | 37 | 37 | 75 | 25 | 0 |
| 3 | 32 | 308 | 75 | 25 | 0 |
| 4 | 14 | 1043 | 0 | 1 | 99 |
| 5 | 62 | 13 | 75 | 25 | 0 |
| 6 | 19 | 32 | 0 | 1 | 99 |
| 7 | 19 | 4 | 1 | 0 | 99 |
| 8 | 19 | 6 | 0 | 1 | 99 |
| 9 | 17 | 83 | 0 | 1 | 99 |
| 10 | 191 | 4 | 0 | 90 | 10 |
| 11 | 180 | 80 | 0 | 75 | 25 |
| 12 | 13 | 16 | 0 | 1 | 99 |
| 13 | 68 | 232 | 0 | 1 | 99 |
| 14 | 197 | 107 | 0 | 85 | 15 |
| 15 | 240 | 38 | 0 | 100 | 0 |
| 16 | 453 | 8 | 0 | 100 | 0 |

From the above table it is apparent that the concentration of significant leakage products in the water at the bottom may be expected to be high in locations where the bottom formation is of loose character, such as predominantly composed of sand or shell, while the concentration of such products in the water at the bottom in areas where the bottom formation is predominately clay may be expected to be substantially lower than that in the formation. Moreover, the tabulated data indicates clearly that in areas where the bottom formation is of loose, coarse grained character, the determination of the concentration of the leakage products in the water at the bottom may be sufficient, without the taking of formation samples to provide the desired information concerning subterranean petroliferous deposits.

In areas in which the bottom formation is predominantly clay or the like, capable of adsorbing and retaining high concentrations of significant leakage products, the above tabulation indicates that it may be desirable to take samples of the formation as well as samples of water at the bottom throughout the area to provide the best information concerning subterranean petroliferous deposits.

It will thus be seen that the invention provides a method of geochemical prospecting which may be carried rapidly and effectively, and in which the time and labor involved in the taking of samples may be greatly reduced without impairing the accuracy of the results.

The invention is disclosed herein in connection with a method having certain specific steps to be carried out, which is intended by way of illustration only, it being evident that the method is capable of wide variation both in the steps to be taken and the order in which the same are to be carried out, within the spirit of the invention and the scope of the appended claims.

Having thus clearly disclosed the invention, what is claimed as new and desired to secure by Letters Patent is:

1. A method of geochemical prospecting in an area of the earth formation submerged by water, said submerged area having a water bottom and an earth formation beneath said bottom which comprises the steps of:
    taking discrete samples of the water at the bottom within inches of said earth formation but no greater than a foot at a plurality of spaced locations with said submerged area, and
    analyzing each sample to obtain a quantitative measure of the concentration of hydrocarbon leakage products which had migrated from subterranean petroliferous deposits within said earth formation.

2. The method of claim 1 including the further step of taking a sample of soil from the bottom of the submerged area at the same location where the samples of water are taken.

3. The method of claim 2 including the further step of thereafter analyzing to obtain a quantatative measure from the soil samples taken from the bottom to determine the concentration of significant leakage products having migrated from a subterranean petroliferous deposit, and thereafter correlating the quantatative measure obtained from the analysis of the soil samples to obtain separate information concerning such petroliferous deposits.

4. The method of claim 2 wherein the steps of obtaining samples from the water and from the bottom are substantially simultaneously performed.

5. The method of claim 2 wherein the samples of water and of the soil obtained by the steps recited thereat are each stored separately in leak-proof containers.

6. The method of claim 2 wherein the samples of soil are further analyzed to determine the physical characteristics of the Earth's formation at the location of each sample taken from beneath the body of water.

7. A method according to claim 1 wherein said quantitative measure of hydrocarbon concentration is in terms of cc × $10^{-4}$ per liter per sample.

8. The method of claim 1 wherein the water samples obtained in the first step are each placed separately in fluid-tight receptacles but only partly filled and leaving a partially empty volume therein and wherein the analysis of said water samples uses the gas confined in the fluid-tight receptacle.

9. A method according to claim 1 wherein thereafter correlating the quantitative measures from each sample with the location in the submerged area of said sample to obtain information concerning said subterranean petroliferous deposit.

10. The method of claim 1 wherein the water samples are taken by completely filling a sample receiving receptacle and wherein the analysis of the sample includes the step of removing all of the dissolved gases within the water.

* * * * *